United States Patent [19]
Pitts

[11] Patent Number: 5,208,590
[45] Date of Patent: May 4, 1993

[54] FLIGHT PHASE INFORMATION DISPLAY SYSTEM FOR AIRCRAFT PASSENGERS

[75] Inventor: Alexander C. Pitts, Huntington Beach, Calif.

[73] Assignee: Asinc, Inc., Tustin, Calif.

[21] Appl. No.: 763,370

[22] Filed: Sep. 20, 1991

[51] Int. Cl.⁵ .............................................. G01C 23/00
[52] U.S. Cl. .................................. 340/973; 340/990; 358/103; 364/460
[58] Field of Search ............... 340/995, 990, 988, 996, 340/971, 945, 973; 358/103, 93, 254; 364/460, 449, 439, 444, 443, 424.06; 73/178 R; 342/451; 434/49

[56] References Cited
U.S. PATENT DOCUMENTS

| | | | |
|---|---|---|---|
| 3,815,261 | 6/1974 | Faconti, Jr. | 434/49 |
| 4,584,603 | 4/1986 | Harrison | 340/988 |
| 4,774,514 | 9/1988 | Hildebrandt et al. | 340/971 |
| 4,975,696 | 12/1990 | Salter, Jr. et al. | 340/990 |
| 5,025,382 | 6/1991 | Artz | 340/990 |
| 5,057,835 | 10/1991 | Factor et al. | 340/995 |

Primary Examiner—Jin F. Ng
Assistant Examiner—Brent A. Swarthout
Attorney, Agent, or Firm—Price, Gess & Ubell

[57] ABSTRACT

A flight-worthy electronics system connecting the airborne electronics of a passenger aircraft to the visual display system of the aircraft provides passengers with a variety of information tailored to phases of the flight plan of the aircraft. For each phase of the flight plan, a different sequence of information is displayed. Thus, for example, during takeoff, the system may display a map showing the flight plan of the aircraft, whereas during descent, the system may alternately display the distance to destination and time to destination. Other information that may be displayed, as desired, is outside air temperature, altitude, and time or distance to a point of interest. The system causes these sequences of displays to appear automatically as determined by the preprogramming of the system.

6 Claims, 6 Drawing Sheets

| Ground Speed | 574 mph |
| Outside Air Temperature | -67°F |
| Time to Destination | 9:30 pm |
| Altitude | 35,000 feet |

FLIGHT PHASE INFORMATION DISPLAY SYSTEM FOR AIRCRAFT PASSENGERS

BACKGROUND OF THE INVENTION

1. Field of the Invention

The present invention relates generally to improvements in aircraft passenger display systems and, more particularly, pertains to new and improved video display systems in the passenger compartment of an aircraft wherein instructive and entertaining information is displayed to the passengers.

2. Description of the Prior Art

Display systems relating to aircraft abound in the prior art. Such systems are utilized for a variety of purposes, such as tracking and analyzing information relating to air traffic control, displaying information on flights to provide for advanced planning and scheduling, and monitoring ground traffic at an airport. Other than U.S. Pat. No. 4,975,696 (Salter, Jr. et al.), all such systems are used solely for the administering of aircraft traffic.

In U.S. Pat. No. 4,975,696, an electronics package connecting the airborne electronics of a passenger aircraft to the passenger visual display system of the aircraft was disclosed. The electronics package provides passengers with a variety of real-time displays of information, such as ground speed, outside air temperature, or altitude. Other information displayed by the electronics package included a map of the area over which the aircraft flies and destination information, such as a chart of the destination terminal including aircraft gates and connecting flight information listings.

Although the electronics package of U.S. Pat. No. 4,975,696 provides much useful information to passengers in an aircraft, it does not automatically tailor such information to the phases of flight of the aircraft.

SUMMARY OF THE INVENTION

Accordingly, it is an object of this invention to provide a display system for aircraft passengers that displays a predetermined sequence of display information corresponding to each phase of the flight plan of the aircraft.

It is another object of this invention to provide a real-time flight information display system for aircraft passengers that provides useful information to the passengers en route to their destination.

A further object of the present invention is to provide a flight information display system for aircraft passengers that connects into the present passenger information display system of the aircraft.

Yet another object of the present invention is to provide a flight information display system for aircraft passengers wherein the system displays flight information, such as ground speed, distance on time to destination, time or distance to points of interest, flight plan, and outside air temperature, for example.

The invention provides an information display system for aircraft passengers in an aircraft following a flight plan and having a receiver for receiving flight information and a video display system. The information display system comprises memory means for storing a plurality of sequences of display information, each sequence corresponding to a phase of the flight plan of the aircraft, with the memory means also storing, for each phase of the flight plan, a plurality of ranges of flight information; and a data processor means for determining a current phase of the flight plan. The data processor means determines the current phase of the flight plan by: comparing the received flight information with each of the plurality of ranges of flight information stored by the memory means; identifying, out of the plurality of the ranges, a current range wherein the current range corresponds to the received flight information; and determining the current phase of the flight plan as being the phase corresponding with the current range. The data processor means also retrieves a sequence of display information corresponding to the determined current phase of flight and inputs the retrieved sequence of display information to the video display system for display to the passengers, such that, as each phase of the flight plan is reached, the system displays a new sequence of informative video displays to the passengers.

In accordance with a preferred embodiment, the data processor means includes means for repeatedly inputting the sequence of display information corresponding to the current phase of the flight plan to the display device until the data processor determines that the aircraft has reached a new phase of the flight plan. The data processor means includes means responsive to a change in the current phase of the flight plan to input a sequence of display information corresponding to a new current phase of the flight plan to the display device. As desired, the data processor means can input the display sequence corresponding to the new current phase of the flight plan to the display device only once, then reinput the display sequence corresponding to a previous phase of the flight plan.

BRIEF DESCRIPTION OF THE DRAWINGS

Other objects and many of the attendant advantages of this invention will become apparent as the invention becomes better understood by reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a flight information display system for passengers in an aircraft, wherein the aircraft follows a flight plan comprised of flight phases, and wherein the displayed information is tailored to the phases of the flight plan. Exemplary flight phases include: power on, preflight, engine start, taxi out, take-off, initial climb, climb, en route cruise, descent, approach/land, rollout, taxi in, go around, and engine shutdown.

Figure 1:
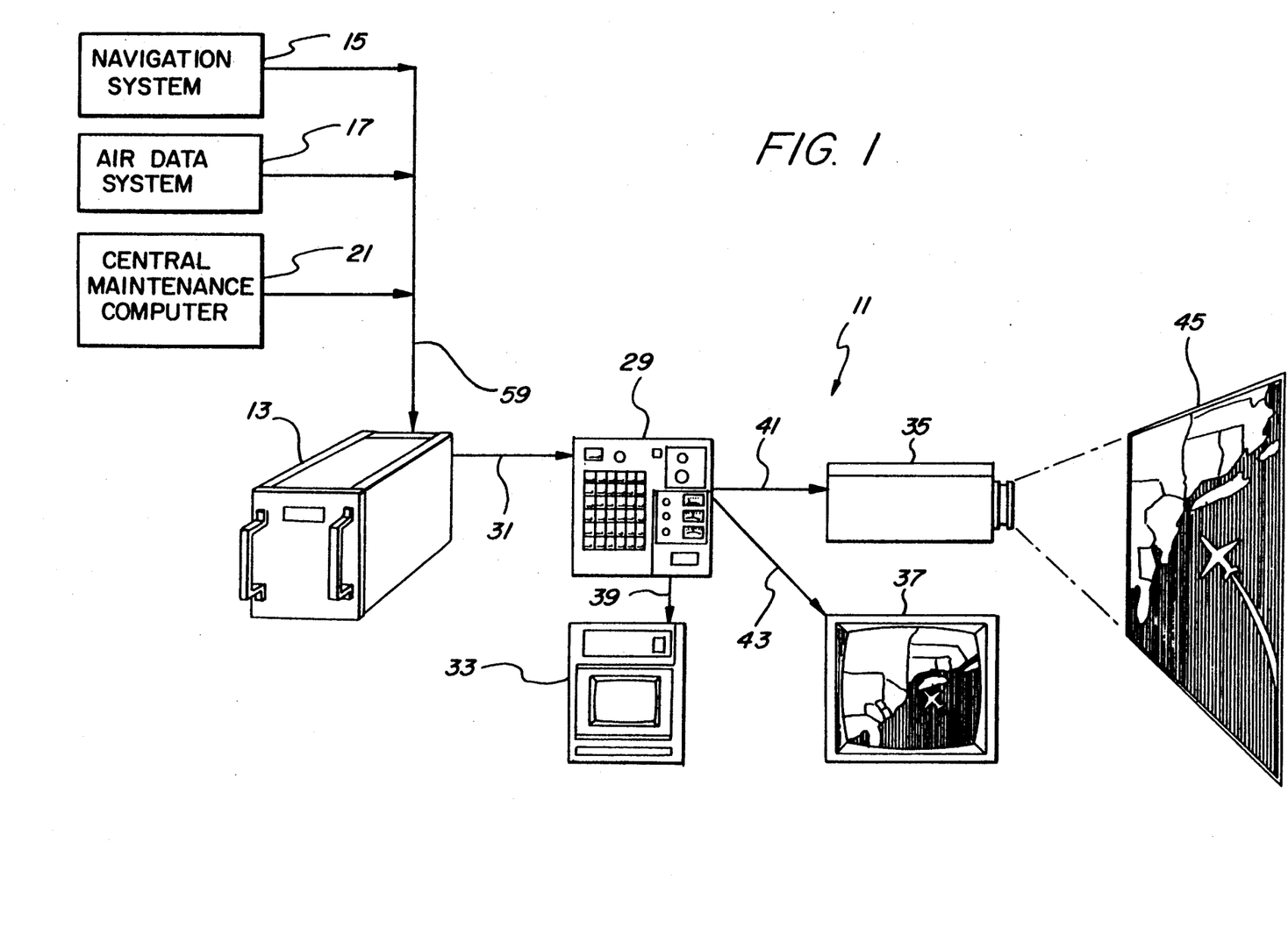
FIG. 1 is a block diagram, somewhat in pictorial form, of an aircraft video display system utilizing the present invention.

Referring first to FIG. 1, a possible on-board system 11 for displaying information to the passengers in the aircraft passenger compartment is illustrated. The heart of the system, a data processor 13, receives messages containing flight information over a data bus 59 from various systems of the aircraft. Examples of such systems include a navigation system 15, an aircraft air data system 17, and a central maintenance computer 21. Each of these systems from which information is received is entirely conventional and will not be described in detail. Data processor 13 may be connected to any one or a multiple of these systems depending on the type of information desired to be displayed to the passengers of the aircraft.

Data processor 13 utilizes the received flight information and determines the current phase of the flight plan of the aircraft, i.e., the system determines whether the aircraft is in "en route cruise," "descent," etc. Once the current phase of the flight plan has been determined, data processor 13 generates one or more sequences of graphic display screens tailored to the current phase of the flight plan for display to the passengers of the aircraft. For example, if the aircraft is in an "en route cruise" phase, data processor 13 may generate a sequence of displays including a "ground speed and outside air temperature" screen and a "flight plan" screen, the latter showing a map of the route of the aircraft. Whereas, if the aircraft is in a "descent" phase, data processor 13 may generate a sequence of displays including a "time to destination" screen and a "distance to destination" screen.

After processing the received flight information and generating display screens tailored to the current phase of the flight plan, data processor 13 transmits the displays over link line 31 to a conventional video selector unit 29 that routes the information to a plurality of conventional video display systems. For example, the information may be transmitted over link lines 39 to a preview monitor 33, or over link lines 43 to a video monitor 37, or over link lines 41 to a video projector 35, which projects the sequences of displays received onto a video screen 45. It should be understood that this particular illustration of an aircraft video display system is only set forth as an example of one of many such systems that may be utilized and, therefore, should not be considered as limiting the present invention. It should further be understood that, in FIG. 1, only one exemplary display screen is shown, that being a "flight plan map" screen, but in practice an entire sequence of display screens is provided.

Figure 2:
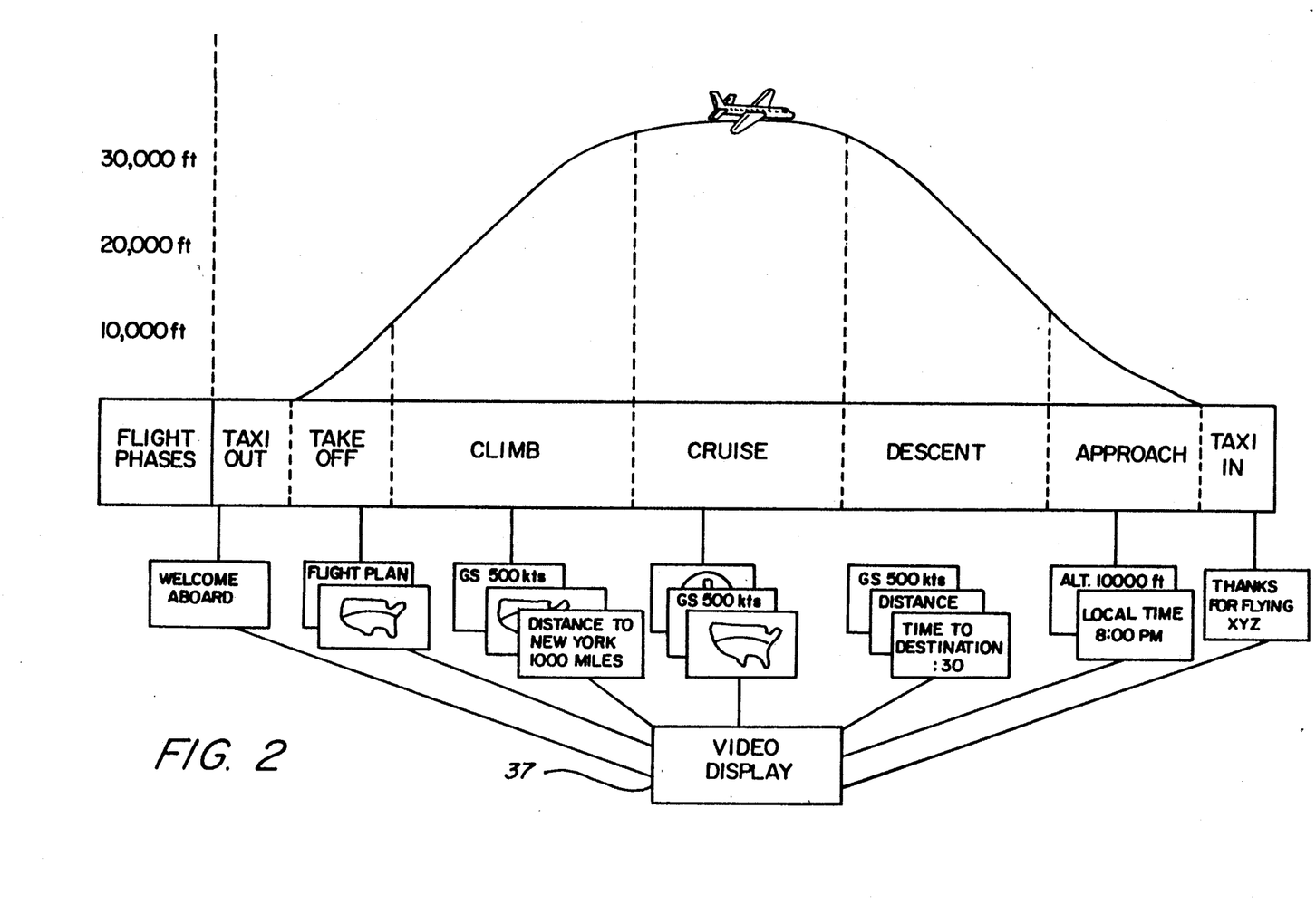
FIG. 2 illustrates possible graphic display screens generated by the display system of the present invention.

FIG. 2 more clearly illustrates that, for exemplary phases of the flight plan of the aircraft, different sequences of display screens are provided.

Thus, data processor 13 receives flight information, determines the current phase of the flight, and generates a sequence of displays corresponding to the current phase of the flight plan for presentation to the passenger audience of the aircraft.

Figure 3:
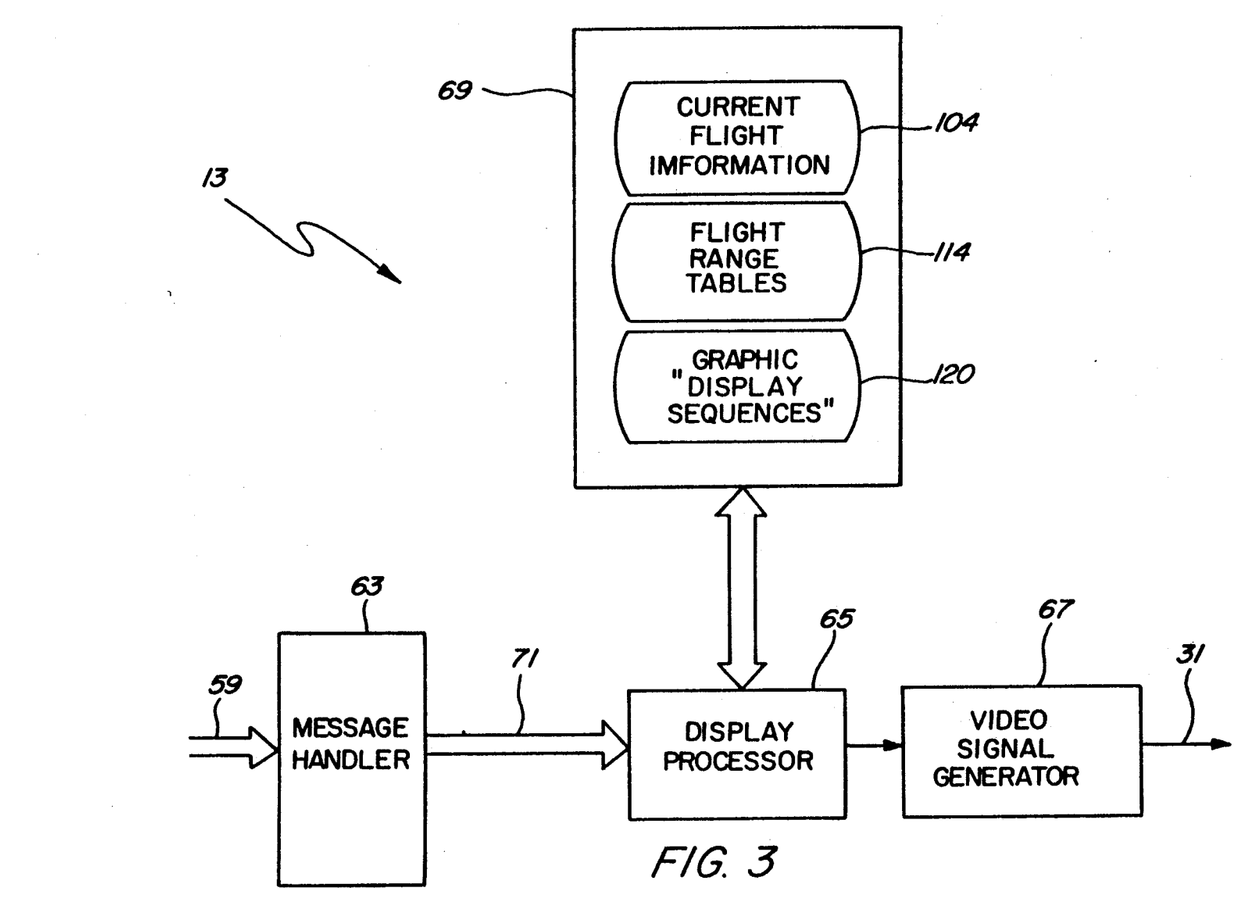
FIG. 3 is a block diagram of the data processor display generator of the present invention.

Referring to FIG. 3, a more detailed illustration of the data processor 13, according to the present invention, is illustrated. Data processor 13 includes: a message handler 63 for receiving flight information messages; a display processor 65 for determining the current flight phase and for generating graphic display sequences corresponding to the current flight phase; and a data storage unit 69 for maintaining flight information and other relevant data.

Message handler 63 receives flight phase information as encoded messages over data bus 59. As each new flight information message is received, message handler 63 generates a software interrupt. Processor 65 responds to the software interrupt to retrieve the latest flight information from message handler 63. Once retrieved, display processor 65 stores the flight information in a flight information block 104 in data storage unit 69.

In addition to maintaining flight information, storage unit 69 maintains specific sequences of graphic displays 120 corresponding to the phases of the flight plan of the aircraft and maintains "range" tables 114, which allow display processor 65 to determine the current phase of the flight plan. For example, for the "en route cruise" phase, range table 114 may define an altitude range of at least 25,000 feet such that, if the received flight information includes the current altitude of the aircraft, and the current altitude is greater than 25,000 feet, data processor 65 can thereby determine that the current phase of the flight plan is the "en route cruise" phase and retrieve a sequence of graphic screens appropriate to the "en route cruise" phase of the flight plan.

Also as an example, range tables 114 may also include points of interest along the flight route of the aircraft. For each point of interest, range tables 114 provide the location of the point of interest and a "minimum range distance" for the point of interest. If the received flight information includes the location of the aircraft, display processor 65 determines whether the aircraft is located within the minimum range associated with any particular point of interest. Thus, once the aircraft has reached the vicinity of a point of interest, the system can automatically retrieve and display a sequence of graphic screens informing the passengers of the approaching point of interest. The screens may provide, for example, the name of the point of interest, the distance and travel time to the point of interest, and a map showing the point of interest, with the flight route of the aircraft superimposed thereon. Additional data, not shown in FIG. 3, is maintained by data storage unit 69. The particular information stored in storage unit 69 and the specific means by which data processor 13 accesses and manipulates the information will be described in detail below with reference to FIGS. 4 and 5.

The graphic screens to be displayed are transmitted by display processor 65 to a video signal generator 67 over a link line 75. Video signal generator 67 modulates the output data onto a video signal on data line 31 to drive the video displays via selector unit 29 (FIG. 1).

Figure 4:
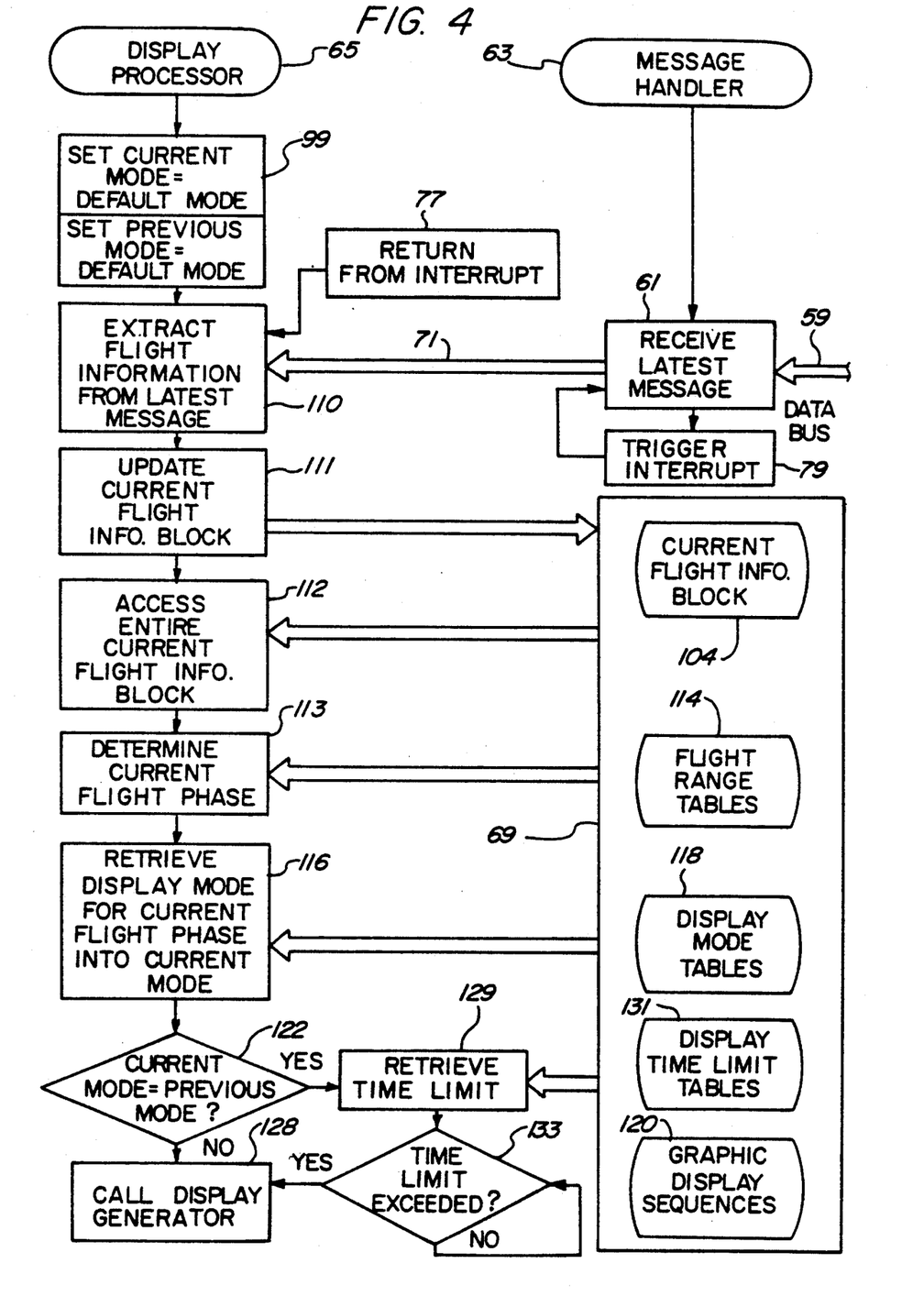
FIG. 4 is a flow chart representing the process by which the data processor of the present invention functions to accomplish the ends of the invention.
Figure 5:
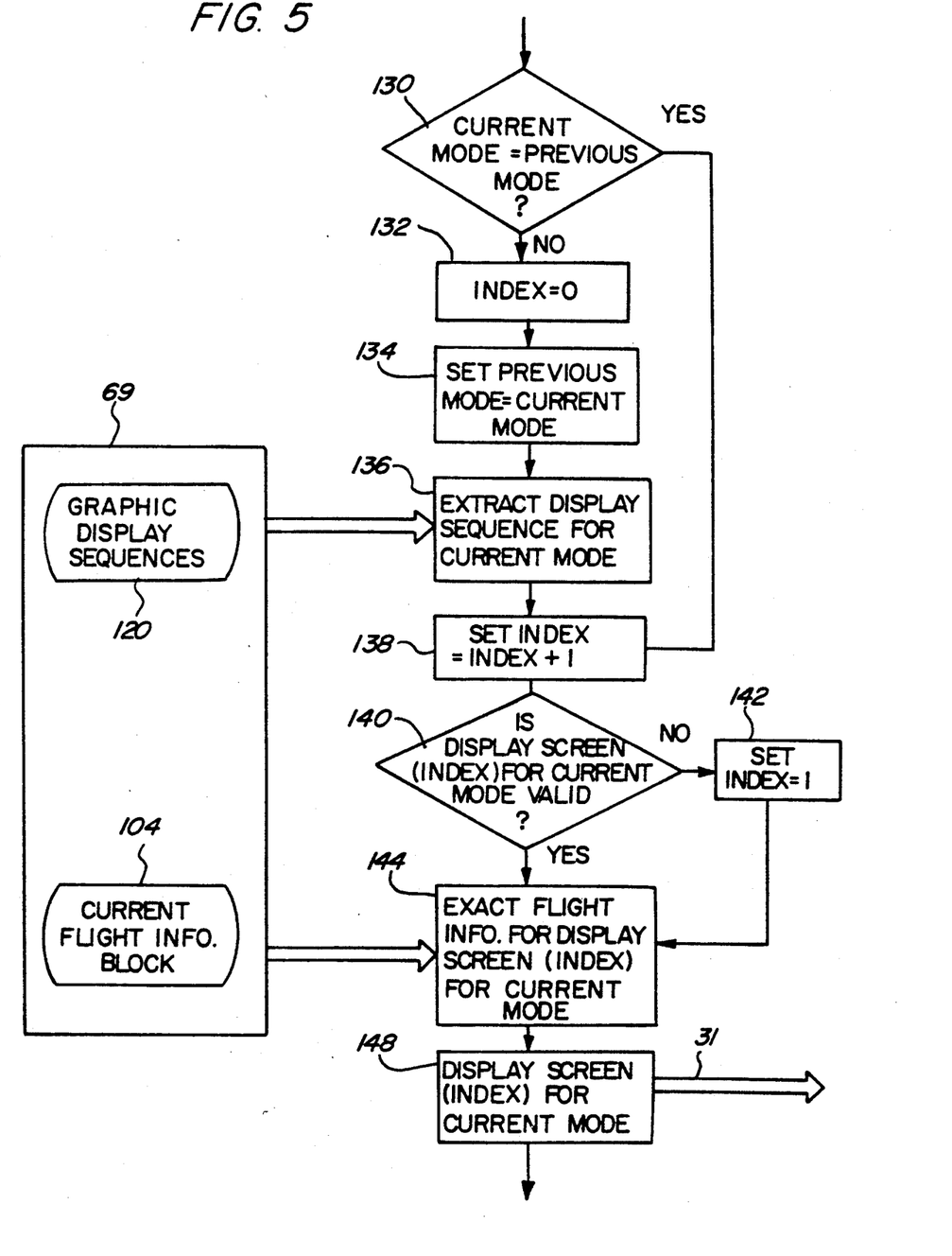
FIG. 5 is a flow chart showing the process of the display generator of the processor.

Data processor 13 operates on the information it receives in a manner illustrated by the flowcharts of FIGS. 4 and 5. In FIGS. 4 and 5, control flow is represented by single lines and data flow is represented by double lines.

Referring first to FIG. 4, message handler 63 receives encoded incoming messages, at 61, via data bus 59, from any of the input sources shown in FIG. 1, such as, for example, the central maintenance computer 21.

After each message is received, a software interrupt is triggered, 79. As can be seen, message handler 63 executes in a loop to continuously receive incoming messages and generate software interrupts. The means by which message handler 63 receives information from data bus 59 and generates the software interrupt is conventional and will not be described in detail.

The processes executed by display processor 65 are provided on the left side of FIG. 4. As noted above, display processor 65 includes means for determining the current phase of the aircraft and for generating graphic display sequences corresponding to each phase of the flight plan. Each sequence of graphic images represents a "display mode." Each phase of the flight plan of the aircraft has associated with it one such display mode. Internally, the display modes may be represented by integers. Although each flight phase has only one associated mode, a particular mode may be associated with more than one flight phase. Thus, for example, the sequence of screens displayed during "climb" and "descent" may be the same, and may be represented by a single display mode.

Initially, at 99, display processor 65 defines two parameters, a "current mode" and a "previous mode." The current mode parameter is used to represent the display mode associated with the current phase of the flight plan of the aircraft, and the previous mode represents the display mode associated with the last, or previous, phase of the flight plan of the aircraft. At 99, current mode and previous mode are each set to a default value, preferably representing a default display mode such as, for example, a "Welcome Aboard" screen.

When a message is received, display processor 65 responds to the software interrupt triggered by message handler 63 and immediately interrupts whatever it is doing to receive and process the latest message. Interrupt processing begins at 110, where display processor 65 receives the latest flight information from message handler 63 along a data line 71 and extracts the flight information from the message. The format of the flight information messages and the process by which the messages are decoded or parsed are discussed below. Relevant flight information extracted from each incoming message includes, for example, one of: a ground speed value, an altitude value, a time or distance from departure, a time or distance from destination, etc.

At 111, display processor 65 updates current flight information block 104 of data storage unit 69 with the extracted information. Flight information block 104 maintains all information that has been received relevant to the status of the flight. Each individual message received by display processor 65 includes only one flight information parameter, such as the altitude or the distance to destination. At 111, in a manner described below, display processor 65 determines the type of information received in the latest message and updates only the appropriate field in flight information block 104. If the latest message includes an altitude value, display processor 65 updates only the altitude field of flight information block 104 and leaves all other data undisturbed. Thereby, flight information block 104 is updated to maintain the latest flight information received for all types of flight parameters.

At 112, display processor 65 accesses the entire flight information block 104 from data storage unit 69. Thus, data processor 65 accesses not only the information provided in the latest message, but all data relevant to the flight of the aircraft.

At 113, display processor 65 determines the current phase of the flight plan of the aircraft. This is typically accomplished by comparing the extracted flight information to data provided in range tables 114 (described below). However, in some cases, the flight information message initially received by message handler 63 simply designates the current phase of flight. In such case, display processor 65 need not access flight range tables 114.

At 116, display processor 65 retrieves the current display mode associated with the current flight phase. As noted above, a display mode represents a specific sequence of displays associated with a flight phase including, for example, a ground speed display, a flight plan map display, and a distance to destination display.

The various display modes associated with the flight phase are stored in a display mode table 118. Preferably, various display modes are merely represented by integers and display mode table 118 includes, for each flight phase, the corresponding display mode integer.

Display processor 65 determines whether the current display mode is different from the previous display mode at step 122. If display processor 65 determines that the aircraft has reached a new phase of the flight, then, at 128, a display generator is called to update the graphic display. Of course, if display processor 65 is executing for the first time, current mode and previous mode will necessarily be the same, and the display generator will be called to generate the first graphic display rather than to update a current graphic display.

If a mode has previously been displayed, and if display processor 65 has determined that the aircraft has not reached a new phase of the flight such that a new mode need not be displayed, then current mode will be equal to previous mode, and execution will continue at 129. At 129, display processor 65 retrieves a time limit associated with the current display from a time limit table 131 from data storage unit 69. Each graphic display of each display mode has a maximum display time. For example, a display screen showing the location of the aircraft superimposed on the flight route of the aircraft may have a maximum time of 30 seconds, whereas a screen showing the air speed of the aircraft may have a maximum time of 5 seconds. In this manner, screens providing considerable information are displayed to the passengers for a longer period of time than screens showing less information. Once the time limit for the current display screen has been retrieved, data processor 65 determines, at 133, whether the time limit has been exceeded. Although not shown in the figures, such can easily be accomplished by using an on-board clock to retrieve the time when a display is first presented, than to access the on-board clock to retrieve the time whenever step 129 is executed. By comparing the elapsed time with the retrieved time limit, data processor 65 determines whether the time limit has been exceeded. If the time limit for the screen has been exceeded, the display generator is called to display a new screen in the current mode.

Thus, display generator 128 is called under two circumstances, namely, whenever a new phase of the flight has been encountered, or whenever the time limit for any particular display screen has been exceeded.

The process of display generator 128 is shown in detail in FIG. 5. For clarity, not all tables of data storage unit 69 are represented in FIG. 5. Rather, only those tables accessed by display generator 128 are represented. Initially, at 130, display generator 128 determines whether the current mode is equal to the previous mode. As noted above, this is an indication of whether the aircraft has reached a new phase of the flight plan.

If current mode is unequal to previous mode, then, at 132, display generator 128 sets a display screen index equal to 0. Next, at 134, display generator 128 resets previous mode equal to current mode.

At 136, display generator 128 extracts a specific display sequence corresponding to the current display mode.

At 138, display generator 128 increments the display index.

If, at 130, display generator 128 determined that the current mode was equal to the previous mode such that a new phase of the flight plan had not been reached, then steps 132, 134, and 136 are bypassed, and step 138 is executed immediately to increment the display index. In this manner, if the aircraft remains within one phase of the flight plan for an extended period of time such that display generator 128 is called repeatedly, the display index is successively incremented numerous times.

At 140, display generator 128 determines whether a valid display screen exists for the current display index value. This is necessary since each display mode includes only a limited number of display screens. The display index therefore cannot be incremented to a value greater than the maximum number of display screens available in the current mode.

For example, the display mode associated with the take-off phase of the aircraft may include only one display screen. The display mode associated with the "en route cruise" phase of the flight may include a far greater number of display screens, since the "en route cruise" phase may last for an extended period of time.

In principle, an arbitrary but finite number of display screens could be associated with each display mode. However, in practice each display mode is typically limited to 32 display screens.

At 140, if the display index has been incremented to 5, whereas the current display mode only includes four screens, the index value of 5 is invalid for the current mode, and the index is automatically reset to 1, at 142. By resetting the display index equal to 1, at the completion of each cycle of displays, the current mode can be cycled any number of times until a new flight phase is reached.

From either step 140 or step 142, processing continues at step 144.

At 144, display generator 128 extracts any flight information necessary for inclusion in the current display screen. Such information is extracted from the flight information block 104 of data storage unit 69. Thus, for example, if the current display screen is a ground speed screen, display generator 128 extracts the current ground speed from flight information table 104 and inserts the ground speed into the display screen. If the current display sequence is a distance to destination screen, display generator 128 extracts the aircraft's destination and the distance to the destination from flight information table 104, and then inserts that information into the graphic display screen.

As a final example in this regard, if the graphic display sequence includes a map of the flight plan of the aircraft, display generator 101 extracts the location of the aircraft from the current flight information block and then inserts a graphic icon representing the aircraft at its current location on the map. Other types of information that may be inserted into the current display sequence may include altitude, outside air temperature, date or time of day, etc.

Once the graphic display sequence has been retrieved and appropriate flight information inserted therein, display generator 128 calls a single screen display unit 148 to output the display screen to the passengers along data link 31 to video selector unit 29 (FIG. 1).

Figure 6:
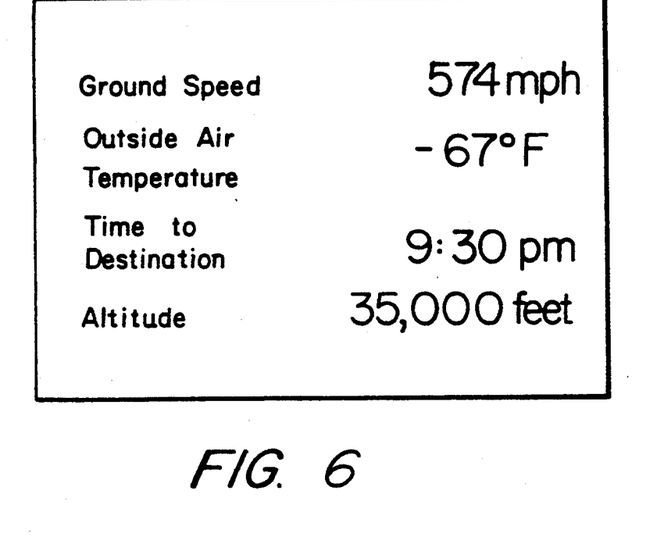
FIG. 6 is a representation of a screen that may be displayed by the system of the present invention.
Figure 7:
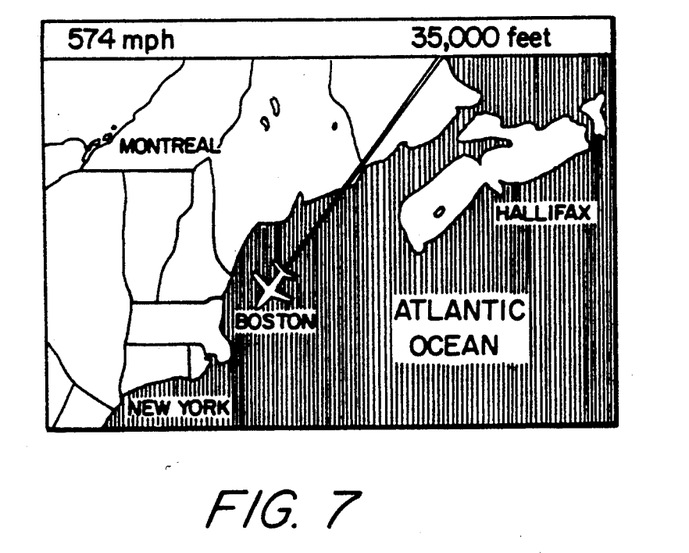
FIG. 7 is another representation of a screen that may be displayed by the system of the present invention.

Exemplary display screens are shown in FIGS. 6 and 7. In FIG. 6, the ground speed, outside air temperature, time to destination, and altitude information are displayed.

In FIG. 7, a map of the area over which the aircraft is traveling is displayed with the ground speed and altitude information displayed across the top portion of the map.

To briefly summarize, message handler 63 receives incoming messages from flight systems of the aircraft and triggers a software interrupt as each message is received. Display processor 65 responds to each interrupt to retrieve the latest message, extract relevant flight information from the message, and update the current flight information block, which thereby maintains the latest flight information covering a wide variety of flight parameters. Then, display processor 65 accesses the entire flight information block from memory, uses information contained therein to determine the current phase of the flight plan of the aircraft, and then retrieves, from memory, the display mode associated with that phase of the flight plan.

If a new phase of the flight plan has been reached, or if a currently displayed screen has been displayed in excess of its time limit, display generator 128 is called to display a new screen. If the aircraft has not reached a new phase of the flight plan, and if the currently displayed screen has not been displayed in excess of its time limit, display processor 65 merely reexecutes step 133 and continues to monitor the time limit until the time limit is exceeded or until a software interrupt is received indicating that a new message has been received by message handler 63. When a software interrupt is received, display processor 65 terminates whatever it is doing and returns to step 110 to receive the new message. Note that display processor 65 returns to step 110 only when a software interrupt is received and, therefore, does not unnecessarily execute any of steps 110, 111, 112, 113, 116, and 122, as these steps are only needed when a new message is received.

The manner by which display processor 65 determines the current flight phase will now be described in greater detail with reference to Tables I-VII.

Flight information messages received and processed by message handler 63 are encoded in ARINC 429 data format. ARINC 429 is a standard data format widely used in the airline industry and will only be described here generally or with reference to specific exemplary messages. ARINC 429 data is transmitted in a 32-bit word shown in Table I. The first 8 bits of the 32 bits comprise an octal label which indicates the type of information conveyed in the message. Actual flight information is stored in bits 9 through 29. Bits 30 and 31 represent a sign status matrix associated with the flight information of bits 9 through 29. The sign status matrix provides a code indicating plus or minus or north, south, east, west, as needed. Bit 32 is a parity bit.

TABLE I

| Bit No. | Function |
| --- | --- |
| 32 | Parity |

TABLE I-continued

| Bit No. | Function |
|---|---|
| 31 | SSM |
| 30 | |
| 29 | |
| 28 | |
| 27 | |
| 26 | |
| 25 | |
| 24 | |
| 23 | |
| 22 | |
| 21 | |
| 20 | |
| 19 | |
| 18 | |
| 17 | |
| 16 | |
| 15 | |
| 14 | |
| 13 | |
| 12 | |
| 11 | |
| 10 | |
| 9 | |
| 8 | Octal |
| 7 | Label |
| 6 | |
| 5 | |
| 4 | |
| 3 | |
| 2 | |
| 1 | |

Table II provides a list of types of information transmitted within an ARINC 429 data word and the respective octal label. As can be seen from Table II, a wide variety of flight information is available within the ARINC 429 data format. The present system does not necessarily use all of the types of information that are available. Further, certain types of information, such as Greenwich Mean Time, date, and air temperature, are preferably used by the system for display only, and are not used for determining the current flight phase.

Table III provides an exemplary ARINC 429 word containing a flight phase indication. As can be seen from Table III, the octal label for flight phase information is 126. The actual flight phase is encoded in bits 11 through 14, with bits 15 through 29 unused. The data code extracted from bits 11 through 14 is shown in Table IV, along with the corresponding flight phase.

Table V provides a second example of an ARINC 429 word wherein the air temperature outside the aircraft is provided. The octal label for the message of Table V is 213. The air temperature is encoded in bits 15 through 29.

TABLE II

| Description | Octal Label |
|---|---|
| Present Position Latitude | 310 |
| Present Position Longitude | 311 |
| Groundspeed | 312 |
| Groundspeed | 012 |
| True Heading | 314 |
| True Track | 313 |
| Wind Speed | 315 |
| Wind Angle | 316 |
| Wind-on-nose | 163 |
| GMT | 125 |
| Date | 260 |
| Distance to Waypoint | 251 |
| Time to Waypoint | 252 |
| True Airspeed | 210 |
| Mach | 205 |
| Static Air Temperature | 213 |
| Baro-corrected Altitude | 204 |
| Pressure Altitude | 203 |
| Distance to Destination | 351 |
| Time to Destination | 352 |
| Equipment Identification | 371 |
| Distance to Destination | 351 |
| Time to Destination | 352 |
| Equipment Identification | 371 |
| GMT | 150 |
| Distance to Destination | 176 |
| Time to Destination | 177 |

TABLE III

| Bit No. | Function | Bit Status |
|---|---|---|
| 32 | Parity | |
| 31 | SSM | |
| 30 | | |
| 29 | Pad | |
| 28 | | |
| 27 | | |
| 26 | | |
| 25 | | |
| 24 | | |
| 23 | | |
| 22 | | |
| 21 | | |
| 20 | | |
| 19 | | |
| 18 | | |
| 17 | | |
| 16 | | |
| 15 | | |
| 14 | Flight | X |
| 13 | Phase | X |
| 12 | Code | X |
| 11 | | X |
| 10 | SDI | 0 |
| 9 | | 0 |
| 8 | Octal | 0 |
| 7 | Label | 1 |
| 6 | 126 | 0 |
| 5 | | 1 |
| 4 | | 0 |
| 3 | | 1 |
| 2 | | 1 |
| 1 | | 0 |

TABLE IV

| Flight Phase | Bit No. 14-11 |
|---|---|
| Power On | 0 0 0 1 |
| Pre-Flight | 0 0 1 0 |
| Engine Start | 0 0 1 1 |
| Taxi Out | 0 1 0 0 |
| Take-Off | 0 1 0 1 |
| Initial Climb | 0 1 1 0 |
| Climb | 0 1 1 1 |
| En route Cruise | 1 0 0 0 |
| Descent | 1 0 0 1 |
| Approach/Land | 1 0 1 0 |
| Rollout | 1 0 1 1 |
| Taxi In | 1 1 0 0 |
| Go Around | 1 1 0 1 |
| Engine Shutdown | 1 1 1 0 |

TABLE V

| Bit No. | Function |
|---|---|
| 32 | Parity |
| 31 | SSM |
| 30 | |
| 29 | 2's complement of |
| 28 | integer one-fourth |

TABLE V-continued

| Bit No. | Function |
|---|---|
| 27 | degree Centigrade |
| 26 | |
| 25 | |
| 24 | |
| 23 | |
| 22 | |
| 21 | |
| 20 | |
| 19 | |
| 18 | |
| 17 | |
| 16 | |
| 15 | |
| 14 | |
| 13 | |
| 12 | |
| 11 | |
| 10 | |
| 9 | |
| 8 | Octal |
| 7 | Label |
| 6 | 213 |
| 5 | |
| 4 | |
| 3 | |
| 2 | |
| 1 | |

Display processor 65, decodes each received message, processes the contents, and stores relevant flight information in flight information block 104 of data storage unit 69. The flight information block maintains all of the most recently received information relating to the various relevant types of flight information. In other words, the flight information block includes various fields for storing the current phase of the flight plan of the aircraft, present position, ground speed, time, date, outside air temperature, etc. As noted above, when a new message is received, display processor 65 extracts the flight information and stores it in the appropriate corresponding field of the flight information block. Thus, for example, if a new message includes present location, display processor 65 extracts the location from the ARINC 429 word, and inserts the present location into the corresponding data field within the flight information block without disturbing other fields of the flight information block. If, for example, a received message includes the air temperature, display processor 65 extracts the current air temperature from the ARINC 429 word and updates the air temperature field of the flight information block accordingly. In this manner, the flight information block maintains fields corresponding to all relevant flight information, and those fields are updated as new information is received and processed.

To determine the current flight phase, display processor 65 first examines the flight information block for the availability (validity) of the ARINC 429 flight phase value. If the flight phase value is currently valid, display processor 65 need only decode the flight phase code to determine the current flight phase. However, if the flight phase value is not available or otherwise invalid, information such as ground speed, altitude, and present position are extracted, if available, and compared with range tables 118 of data storage unit 69 to determine the current flight phase.

Periodically, if a new ARINC 429 flight phase value has not been received, the system resets the flight phase value in the flight information block to a default value. In this manner, the flight phase value is only used if current. The time period for checking the flight phase value is a configurable parameter of the system typically set to 30 seconds. Thus, as shown in Table VI, range table 118 may include altitude ranges for "en route cruise," "descent," and "climb" phases of the flight plan of the aircraft.

TABLE VI

| | ALTITUDE RANGES | |
|---|---|---|
| | Min. (ft.) | Max. (ft.) |
| Climb | 1,000 | 25,000 |
| Cruise | 25,000 | — |
| Descent | 1,000 | 25,000 |

An index value is maintained in storage unit 69 that "points" to a range value most recently determined to be appropriate based on information extracted from the flight info block.

Range table 114 is configured to maintain range parameters in a logical sequence of phases. For example, the first range values are "preflight" values, the second are "take-off" values, the third "climb," the fourth "cruise," the fifth "descent," etc.

Therefore, referring to Table VI, if the index value "points" to the "take-off" range (altitude less than 1000 feet) and the altitude has reached 1000 feet, the index is incremented to "point" to the "climb" range.

In this manner, the index value acts as a "flag" for all previously reached "phases," with the sequence of phases never passing directly from "take-off" to "descent" or from "cruise" to "climb."

A separate table, shown in Table VII, maintains points of interest. Periodically, display processor 65 compares the current location with the location of various points of interest in the table and determines whether the aircraft has reached the vicinity of a point of interest. As can be seen from Table VII, range table 118 can include points of interest such as cities and, for each point of interest, include the location in latitude and longitude and a minimum range distance.

TABLE VII

| | POINTS OF INTEREST | | |
|---|---|---|---|
| Item | Latitude | Longitude | Minimum Range |
| City A | 45 degrees | 112 degrees | 100 miles |
| City B | 47 degrees | 114 degrees | 10 miles |
| City C | 35 degrees | 110 degrees | 5 miles |

Thus, for example, city A is represented as having a particular location and a minimum range distance of 100 miles, whereas city B has a different location and a minimum range distance of 10 miles. Display processor 65 includes an algorithm for comparing the current location of the aircraft to the location of each city and for calculating the distance between the aircraft and the city. Once the distance to the city is calculated, display processor 65 determines whether the distance is greater than or less than the minimum range specified for that city.

Taking as an example City A, if the aircraft is 200 miles from city A, display processor 65 will determine that the aircraft has not yet reached the vicinity of city A. Whereas, if the distance between the aircraft and city A is 90 miles, display processor 65 can determine that the aircraft has reached the vicinity of city A and initiate a sequence of displays, previously described, alerting the passengers. The algorithm for calculating the distance between the aircraft and each point of interest, based on the latitudes and longitudes, is conventional in nature and will not be described further. The algorithm takes considerable processing time and, hence, is only executed periodically. For example, the point-of-interest table is only accessed after a certain number of miles of flight or after a certain amount of time has passed.

As previously indicated, range table 118 may include the location of a wide variety of points of interest, including cities, landforms, the equator, the International Date Line, and the North and South Poles.

Once a current flight phase has been determined by reference to the range table 118, processing continues, as shown and described in FIG. 4.

Referring again to FIG. 3, message handler 63 preferably comprises a Motorola 68000 microprocessor chip dedicated solely to receiving flight information messages. Display processor 65 preferably executes within a second Motorola 68000 microprocessor chip. Data storage unit 69 can comprise a stand-alone data memory system; however, preferably data storage unit 69 comprises a section of global memory resident within the second Motorola 68000 microprocessor chip. By implementing data storage unit 69 as a section of global memory, the access time necessary to access the stored data is minimized.

What has been described is a flight information display system for aircraft passengers that provides useful information to the passengers en route to their destination. The system connects into a conventional passenger video display system. It displays sequences of information tailored to the current phase of the flight plan of the aircraft.

Various modifications are contemplated, and they obviously will be resorted to by those skilled in the art without departing from the spirit and scope of the invention as hereinafter defined by the appended claims, as only a preferred embodiment of the invention has been disclosed.

What is claimed is:

1. An information display system for aircraft passengers in an aircraft following a flight plan and having a receiver for receiving flight information and a video display system, the information display system comprising:
    memory means for storing a plurality of display screen formats for displaying flight information, and for storing a plurality of display modes, each mode representing a specific sequence of preselected display screen formats, with each display mode corresponding to one phase of the flight plan of the aircraft;
    said memory means also storing, for each phase of the flight plan, a plurality of ranges of flight information;
    data processor means for determining a current phase of the flight plan by:
        comparing the received flight information with the plurality of ranges of flight information stored by the memory means;
        determining, out of the plurality of ranges, a current range corresponding to the received flight information; and
        identifying the current phase of the flight plan as being the phase corresponding to the current range;
    said data processor means also retrieving a sequence of display screen formats for a display mode corresponding to the determined current phase of flight, inserting received flight information into said display screen formats that is appropriate to said display screen formats, and inputting the retrieved sequence of display formats to the video display system for display to the passengers, such that, as each phase of the flight plan is reached, the system displays a new sequence of informative video displays to the passengers; and
    wherein the current phases of flight include taxi out, take off, initial climb, climb, en route cruise, proximity to points of interest, descent, approach, land, rollout, and taxi in.

2. The system of claim 1, wherein the points of interest include cities along a flight path of the aircraft, landforms, the equator, the international dateline, and the north and south poles.

3. An information display system for aircraft passengers in an aircraft following a flight plan and having a receiver for receiving flight information and a video display system, the information display system comprising:
    memory means for storing a plurality of display screen formats for displaying flight information, and for storing a plurality of display modes, each mode representing a specific sequence of preselected display screen formats, with each display mode corresponding to one phase of the flight plan of the aircraft;
    said memory means also storing, for each phase of the flight plan, a plurality of ranges of flight information;
    data processor means for determining a current phase of the flight plan by:
        comparing the received flight information with the plurality of ranges of flight information stored by the memory means;
        determining, out of the plurality of ranges, a current range corresponding to the received flight information; and
        identifying the current phase of the flight plan as being the phase corresponding to the current range;
    said data processor means also retrieving a sequence of display screen formats for a display mode corresponding to the determined current phase of flight, inserting received flight information into said display screen formats that is appropriate to said display screen formats, and inputting the retrieved sequence of display formats to the video display system for display to the passenger, such that, as each phase of the flight plan is reached, the system displays a new sequence of informative video displays to the passengers; and
    wherein the flight information includes ground speed, altitude, time from departure airport, distance from departure airport, time to destination airport, and distance to destination airport.

4. An information display system for aircraft passengers in an aircraft following a flight plan and having a receiver for receiving flight information and a video display system, the information display system comprising:
    memory means for storing a plurality of display screen formats for displaying flight information, and for storing a plurality of display modes, each mode representing a specific sequence of preselected display screen formats, with each display mode corresponding to one phase of the flight plan of the aircraft;

said memory means also storing, for each phase of the flight plan, a plurality of ranges of flight information;

data processor means for determining a current phase of the flight plan by:

comparing the received flight information with the plurality of ranges of flight information stored by the memory means;

determining, out of the plurality of ranges, a current range corresponding to the received flight information; and identifying the current phase of the flight plan as being the phase corresponding to the current range;

said data processor means also retrieving a sequence of display screen formats for a display mode corresponding to the determined current phase of flight, inserting received flight information into said display screen formats that is appropriate to said display screen formats, and inputting the retrieved sequence of display formats to the video display system for display to the passengers, such that, as each phase of the flight plan is reached, the system displays a new sequence of informative video displays to the passengers; and wherein the memory means stores information regarding a plurality of points of interest, the location of each point of interest, and a minimum distance range corresponding to each point of interest, the flight information includes a current location of the aircraft, and the data processor means further includes means for calculating the distance between the current location of the aircraft to a point of interest and for determining whether the distance to the point of interest is less than the minimum distance range corresponding to the point of interest such that a sequence of display screens identifying the point of interest can be displayed to the passengers.

5. The system of claim 4, wherein the flight information further includes the ground speed of the aircraft and the data processor means further includes means for calculating the time to a point of interest based on the distance to a point of interest and the ground speed of the aircraft.

6. An information display system for aircraft passengers in an aircraft following a flight plan and having a receiver for receiving flight information and a video display system, the information display system comprising:

memory means for storing a plurality of display screen formats for displaying flight information, and for storing a plurality of display modes, each mode representing a specific sequence of preselected display screen formats, with each display mode corresponding to one phase of the flight plan of the aircraft;

said memory means also storing, for each phase of the flight plan, a plurality of ranges of flight information data processor means for determining a current phase of flight plan by:

comparing the received flight information with the plurality of ranges of flight information stored by the memory means;

determining, out of the plurality of ranges, a current range corresponding to the received flight information; and identifying the current phase of the flight plan as being the phase corresponding to the current range;

said data processor means also retrieving a sequence of display screen formats for a display mode corresponding to the determined current phase of flight, inserted received flight information into said display screen formats that is appropriate to said display screen formats, and inputting the retrieved sequence of display formats to the video display stystem for display to the passengers, such that, as each phase of the flight plan is reached, the system displays a new sequence of informative video displays to the passengers, and wherein:

the receiver for receiving flight information receivers sequential messages, each message including a single unit of flight information;

the memory means stores a flight information block having individual fields for storing each of a plurality of individual units of flight information;

the data processor updates the flight information block each time a message is received by inserting the single unit of flight information into a corresponding individual field of the flight information block; and the data processor retrieves the entire flight information block for use in determining the current phase of the flight.

* * * * *